United States Patent
Kim et al.

(10) Patent No.: US 9,637,853 B2
(45) Date of Patent: May 2, 2017

(54) WASHING MACHINE AND BALANCER THEREOF

(75) Inventors: Hooi Joong Kim, Yongin-si (KR); Sung Jong Kim, Seoul (KR); Moo Hyung Lee, Seoul (KR); Jae Seuk Park, Yingin-si (KR); Sung Jin Cho, Yongin-si (KR); Ii Sung Bae, Yongin-si (KR); Ho Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1191 days.

(21) Appl. No.: 13/556,814

(22) Filed: Jul. 24, 2012

(65) Prior Publication Data

US 2013/0025331 A1    Jan. 31, 2013

(30) Foreign Application Priority Data

Jul. 27, 2011 (KR) .................. 10-2011-0074461

(51) Int. Cl.
*D06F 37/22* (2006.01)
*F16F 15/32* (2006.01)

(52) U.S. Cl.
CPC ............ *D06F 37/225* (2013.01); *F16F 15/32* (2013.01); *Y10T 74/2132* (2015.01)

(58) Field of Classification Search
CPC ........ D06F 37/22; D06F 37/225; D06F 37/24; D06F 37/245; F16C 13/06; F16C 33/76; F16C 33/767; F16C 33/768; F16C 13/006; F16C 33/61; F16C 33/585; F16F 15/32; F16F 15/322; Y10T 74/2132
USPC ......................................... 68/23.2; 74/572.4
See application file for complete search history.

(56) References Cited

U.S. PATENT DOCUMENTS

| | | |
|---|---|---|
| 5,813,253 A | 9/1998 | Uhlin |
| 6,439,003 B1 * | 8/2002 | Uhlin ............................. 68/23.2 |
| 2012/0192362 A1 * | 8/2012 | Lee et al. .......................... 8/137 |

FOREIGN PATENT DOCUMENTS

| | | | |
|---|---|---|---|
| KR | 10-2006-0088720 | 8/2006 | |
| KR | 1020100022705 | * 3/2010 | ............ D06F 33/02 |
| KR | 1020100022706 | * 3/2010 | ............ D06F 37/30 |
| KR | 20-2010-0009597 | 9/2010 | |
| KR | 10-2011-0044537 | 4/2011 | |

(Continued)

OTHER PUBLICATIONS

European Decision on Grant dated Jan. 7, 2015 in European Patent Application No. 12177255.2.

(Continued)

*Primary Examiner* — Joseph L Perrin
(74) *Attorney, Agent, or Firm* — Staas & Halsey LLP

(57) ABSTRACT

A washing machine capable of manipulating a balancer with a simple manipulation, and a balancer thereof, the washing machine including a rotating tub configured to accommodate a laundry while being rotatably disposed on a shaft, at least one mass mounted on the rotating tub so as to move in a circumferential direction of the rotating tub, thereby offsetting an unbalanced load of the rotating tub, at least one wire extending along the circumferential direction of the rotating tub and coupled to the at least one mass, and at least one driving unit coupled to the at least one wire and configured to rotate the at least one mass in the circumferential direction of the rotating tub.

13 Claims, 14 Drawing Sheets

(56) References Cited

FOREIGN PATENT DOCUMENTS

| | | |
|---|---|---|
| WO | 99/23397 | 5/1999 |
| WO | 2011/115384 | 9/2011 |

OTHER PUBLICATIONS

Extended European Search Report mailed Dec. 6, 2012, issued in corresponding European Patent Application No. 12177255.2.
Korean Office Action dated Sep. 24, 2015 in Korean Patent Application No. 10-2011-0074461.

* cited by examiner

WASHING MACHINE AND BALANCER THEREOF

CROSS-REFERENCE TO RELATED APPLICATION

This application claims the benefit of Korean Patent Application No. 10-2011-0074461, filed on Jul. 27, 2011 in the Korean Intellectual Property Office, the disclosure of which is incorporated herein by reference.

BACKGROUND

1. Field

Embodiments of the present disclosure relate to a washing machine provided with a balancer for offsetting an unbalanced load.

2. Description of the Related Art

A washing machine is designed to wash laundry by use of electric power, and in general, includes a tub configured to accommodate a washing water, a rotating tub rotatably installed inside the tub, and a motor configured to rotate the rotating tub.

By use of the rotary motion of the rotating tub, a series of washing process including a washing cycle, a rinsing cycle, and a spin dry cycle is performed.

During the rotation of the rotating tub, a laundry is concentrated at a certain position inside the rotating tub without being evenly distributed inside the rotating tub, so the rotating tub has an eccentric rotation, causing a vibration and noise. In addition, the eccentric rotation is increased, and the components such as the rotating tub or the motor may be damaged.

Accordingly, the washing machine is provided with a balancer configured to stabilize the rotation of the rotating tub by offsetting an unbalanced load occurring inside the rotating tub.

However, in the conventional technology, the balancer is manually moved, so the balancer is unlikely to move to a precise position for offsetting the unbalanced load of the rotating tub, thereby failing in minimizing of the vibration and noise.

SUMMARY

Therefore, it is an aspect of the present disclosure to provide a washing machine capable of manipulating a balancer with a simple manipulation, and a balancer thereof.

It is another aspect of the present disclosure to provide a washing machine having at least one driving unit configured to move a mass inside a balancer, and a balancer thereof.

Additional aspects of the disclosure will be set forth in part in the description which follows and, in part, will be obvious from the description, or may be learned by practice of the disclosure.

In accordance with one aspect of the present disclosure, a washing machine includes a rotating tub, at least one mass, at least one wire, and at least one driving unit. The rotating tub may be configured to accommodate a laundry while being rotatably disposed on a shaft. The at least one mass may be mounted on the rotating tub so as to move in a circumferential direction of the rotating tub, thereby offsetting an unbalanced load of the rotating tub. The at least one wire may extend along the circumferential direction of the rotating tub and be coupled to the at least one mass. The at least one driving unit may be coupled to the at least one wire and configured to rotate the at least one mass in the circumferential direction of the rotating tub.

The at least one driving unit may include at least one wheel including a wheel body forming an external appearance of the at least one driving unit; and a rotating part provided in a disk shape so as to rotate inside the wheel body, wherein the at least one wire may be disposed to pass through the wheel body while passing through a portion in between an inner surface of the wheel body and the rotating part, thereby allowing the wire to rotate along with a rotation of the rotating part.

The rotating part may include a plurality of protrusion ribs formed along a circumference of the rotating part while protruding in a radially outward direction, and the at least one wire may be disposed to pass through in between the wheel body and the plurality of protrusion ribs while being engaged between the wheel body and the plurality of protrusion ribs.

The rotating part may include a plurality of protrusion ribs that is formed at a circular surface of the rotating part facing the wheel body, and the at least one wire may be disposed to pass through in between the wheel body and the plurality of protrusion ribs while being engaged between the wheel body and the plurality of protrusion ribs.

The at least one wire may include a plurality of beads inserted around the at least one wire along an entire length of the at least one wire.

The rotating part may include a plurality of protrusion ribs formed along a circumference of the rotating part while protruding in a radially outward direction, and the at least one wire may be disposed to pass through in between the wheel body and the plurality of protrusion ribs while having the plurality of beads of the at least one wire engaged in between the plurality of protrusion ribs.

The rotating part may be rotated by a motor.

The washing machine may further include a shaft provided between the rotating part and the motor so as to transmit a driving force of the motor to the rotating part.

A plurality of gears may be provided between the rotating part and the motor to transmit a driving force of the motor to the rotating part.

The at least one mass may include a first mass and a second mass that are available to rotate in the circumferential direction of the rotating tub, the at least one wire may include a first wire configured to move the first mass and a second wire configured to move the second mass, and the at least one driving unit may include at least one first driving unit configured to rotate the first wire and at least one second driving unit to configured to rotate the second wire.

The first mass and the second mass may move independent of each other.

The first wire may be coupled to the first mass while passing through the second mass, and the second wire may be coupled to the second mass while passing through the first mass.

The washing machine may further include at least one balancer housing configured to accommodate the at least one mass, the at least one wire and the at least one driving unit therein while being coupled to the rotating tub, the at least one balancer housing forming a ring shape channel enabling the mass to move therethrough.

In accordance with another aspect of the present disclosure, a washing machine includes a rotating tub, a balancer housing, at least one mass, at least one wheel and at least one wire. The rotating tub may include a cylindrical part; and a front surface panel and a rear surface panel disposed at a front side and a rear side of the cylindrical part, respectively.

The balancer housing may be installed to at least one of the front surface panel and the rear surface panel and provided with a ring shape channel formed therein. The at least one mass may be configured to move along in the ring shape channel to offset an unbalanced load occurring in the rotating tub when the rotating tub rotates. The at least one wheel may be fixed to an inner side of the ring shape channel so as to rotate at a fixed position. The at least one wire may be insertedly coupled to the at least one mass and extending along inside the channel so as to pass through an interior of a plurality of wheels while being engaged inside the wheel.

In accordance with another aspect of the present disclosure, a washing machine include a cabinet, a tub, a rotating tub, a plurality of balancer housings, a mass, a wheel and a wire. The tub may be disposed inside the cabinet to accommodate water. The rotating tub may be disposed inside the tub to accommodate a laundry so as to rotate by receiving a rotary force of a motor, the rotating tub including a cylindrical part, and a front surface panel and a rear surface panel disposed at a front side and a rear side of the cylindrical part, respectively. The plurality of balancer housings is installed to at least one of the front surface panel and the rear surface panel and provided with a ring shape channel formed therein. The mass may be provided at each channel of the plurality of balancer housings. The wheel may be fixed to an inner side of the each channel so as to rotate at a fixed position. The wire may be provided in the form of a ring inside the channel and coupled to the mass, the wire configured to be rotated by the wheel.

In accordance with another aspect of the present disclosure, a balancer includes a balancer housing, at least one mass, at least one driving unit and at least one wire. The balancer housing may be disposed at a rotating tub and provided at inside thereof with a ring shape channel extending in a circumferential direction of the rotating tub. The at least one mass may be disposed so as to enable movement in the channel, thereby offsetting an unbalanced load during rotation of the rotating tub when the rotating tub rotates. The at least one driving unit may include a wheel body forming an external appearance of the at least one driving unit and a rotating part configured to be rotated at a fixed position inside the wheel body, the at least one driving unit fixed to an inner side of the channel. The at least one wire may be provided in the form of a ring inside the channel so as to rotate by the wheel along the channel and coupled to the mass.

The rotating part may include a plurality of protrusion ribs formed along a circumference of the rotating part while protruding in a radially outward direction, and the at least one wire may be disposed to pass through between the wheel body and the plurality of protrusion ribs while being engaged between the wheel body and the plurality of protrusion ribs.

The rotating part may include a plurality of protrusion ribs that is formed at a circular surface of the rotating part facing the wheel body, and the at least one wire may be disposed to pass through between the wheel body and the plurality of protrusion ribs while being engaged between the wheel body and the plurality of protrusion ribs.

The balancer may further include a plurality of beads inserted around the at least one wire along an entire length of the at least one wire; and a plurality of protrusion ribs formed along a circumference of the rotating part while protruding in a radially outward direction, wherein the at least one wire may be disposed to pass through in between the wheel body and the plurality of protrusion ribs while having the plurality of beads engaged in between the plurality of protrusion ribs As described above, the movement of a mass installed in a balancer is controlled with a simple structure, so that the unbalanced load occurring in the rotating tub is rapidly offset.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
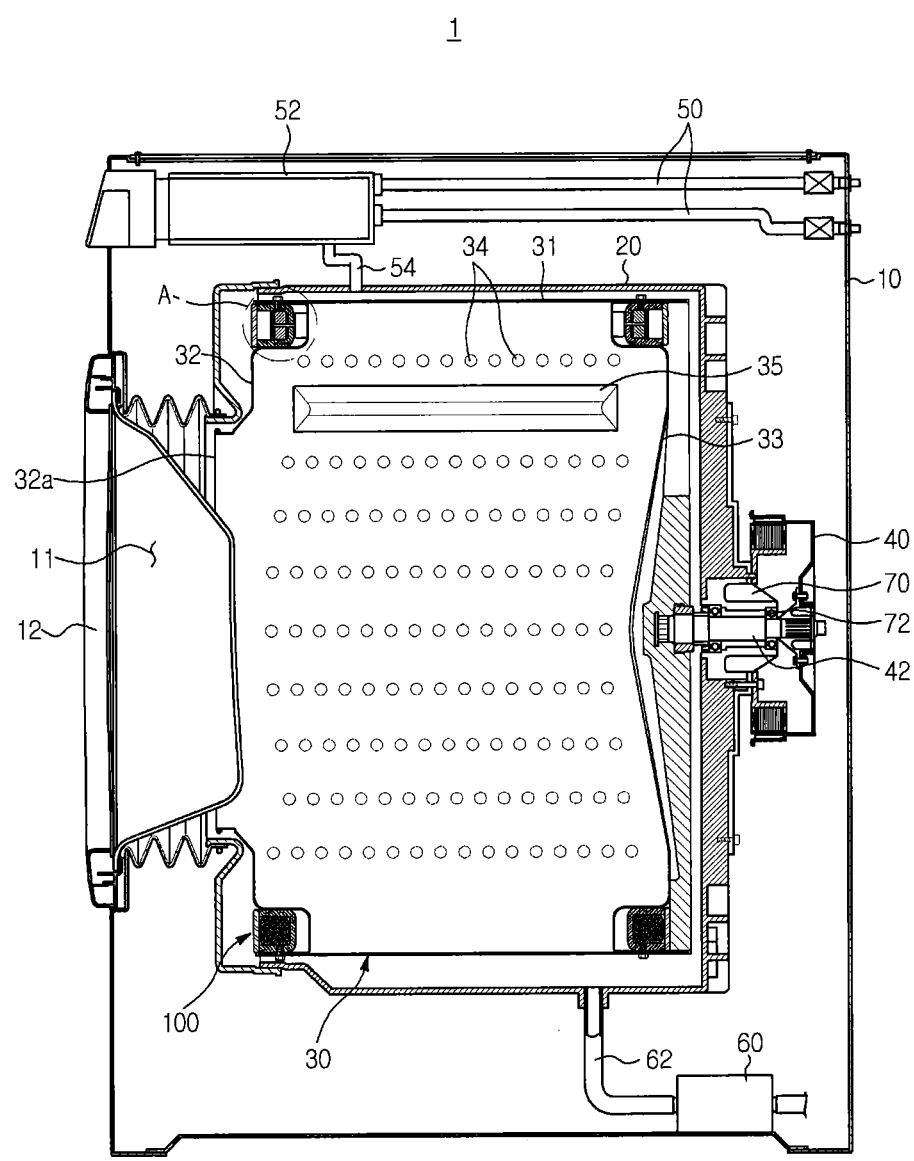
FIG. 1 is a drawing illustrating the configuration of a washing machine in accordance with one embodiment of the present disclosure.

Reference will now be made in detail to the embodiments of the present disclosure, examples of which are illustrated in the accompanying drawings, wherein like reference numerals refer to like elements throughout.

FIG. 1 is a drawing illustrating the configuration of a washing machine in accordance with one embodiment of the present disclosure.

Referring to FIG. 1, a washing machine 1 includes a cabinet 10 forming an external appearance of the washing machine 1, a tub 20 disposed inside the cabinet 10, a rotating tub 30 rotatably disposed inside the tub 20, and a motor 40 configured to drive the rotating tub 30.

The cabinet 10 is provided at a front surface thereof with an inlet 11 into which a laundry is loaded into the inside the rotating tub 30. The inlet 11 is open and closed by a door 12 installed at the front surface of the cabinet 10.

The tub 20 is provided at an upper side thereof with a water supply pipe to supply the washing water to the tub 20. One side of the water supply pipe 50 is connected to an outside water supply source (not shown), and the other side of the water supply pipe 50 is connected to a detergent supply apparatus 52.

The detergent supply apparatus 52 is connected to the tub 20 through a connecting pipe 54. The water received through the water supply pipe 50 is supplied into the inside the tub 20 together with detergent via the detergent supply apparatus 52.

The tub 20 is provided at a lower side thereof with a drainage pump 60 and a drainage pipe 62 installed to discharge the water in the tub 20 to an outside the cabinet 10.

The rotating tub 30 includes a cylindrical part 31, a front surface panel 32 disposed at a front side of the cylindrical part 31, and a rear surface panel 33 disposed at a rear side of the cylindrical part 31. The front surface panel 32 has an opening 32a for input/withdrawal of the laundry. The rear surface panel 33 is connected to a driving shaft 42 to transmit a driving force of the motor 40.

The rotating tub 30 is provided at a circumference thereof with a plurality of through-holes 34 for circulation of the washing water. A plurality of lifters 35 is installed at an inner circumferential surface of the rotating tub 30 to lift and drop the laundry when the rotating tub 30 rotates.

The driving shaft 42 is disposed between the rotating tub 30 and the motor 40. One end of the driving shaft 42 is connected to the rear surface panel 33 of the rotating tub 30, and the other end of the driving shaft 42 extends to outside of a rear side wall of the tub 20. As the motor 40 actuates the driving shaft 42, the rotating tub 30 connected to the driving shaft 42 rotates on the driving shaft 42.

A bearing housing 70 is installed at the rear side wall of the tub 20 so as to rotatably support the driving shaft 42. The bearing housing 70 is formed using an aluminum alloy. The bearing housing 70 may be inserted into the rear side wall of the tub 20 when the tub 20 is formed through an insert molding. Bearings 72 are installed between the bearing housing 70 and the driving shaft 42 such that the driving shaft 42 smoothly rotates.

During a washing cycle, the motor 40 rotates the rotating tub 30 in the clockwise and counter-clockwise directions at a low speed. Accordingly, the laundry contained in the rotating tub 30 repeats rising and falling, thereby removing the dirt from the laundry.

During a spin-dry cycle, the motor 40 rotates the rotating tub 30 in one direction at a high speed, the water is separated from the laundry by a centrifugal force acting on the laundry.

During the spin-dry cycle, when the rotating tub 30 rotates and if the laundry is concentrated at a certain position inside the rotating tub 30 without evenly distributed, the rotary motion of the rotating tub 30 is unstable, thereby causing a vibration and noise.

Accordingly, the washing machine 1 is provided with a balancer 100 to stabilize the rotary motion of the rotating tub 30.

Figure 2:
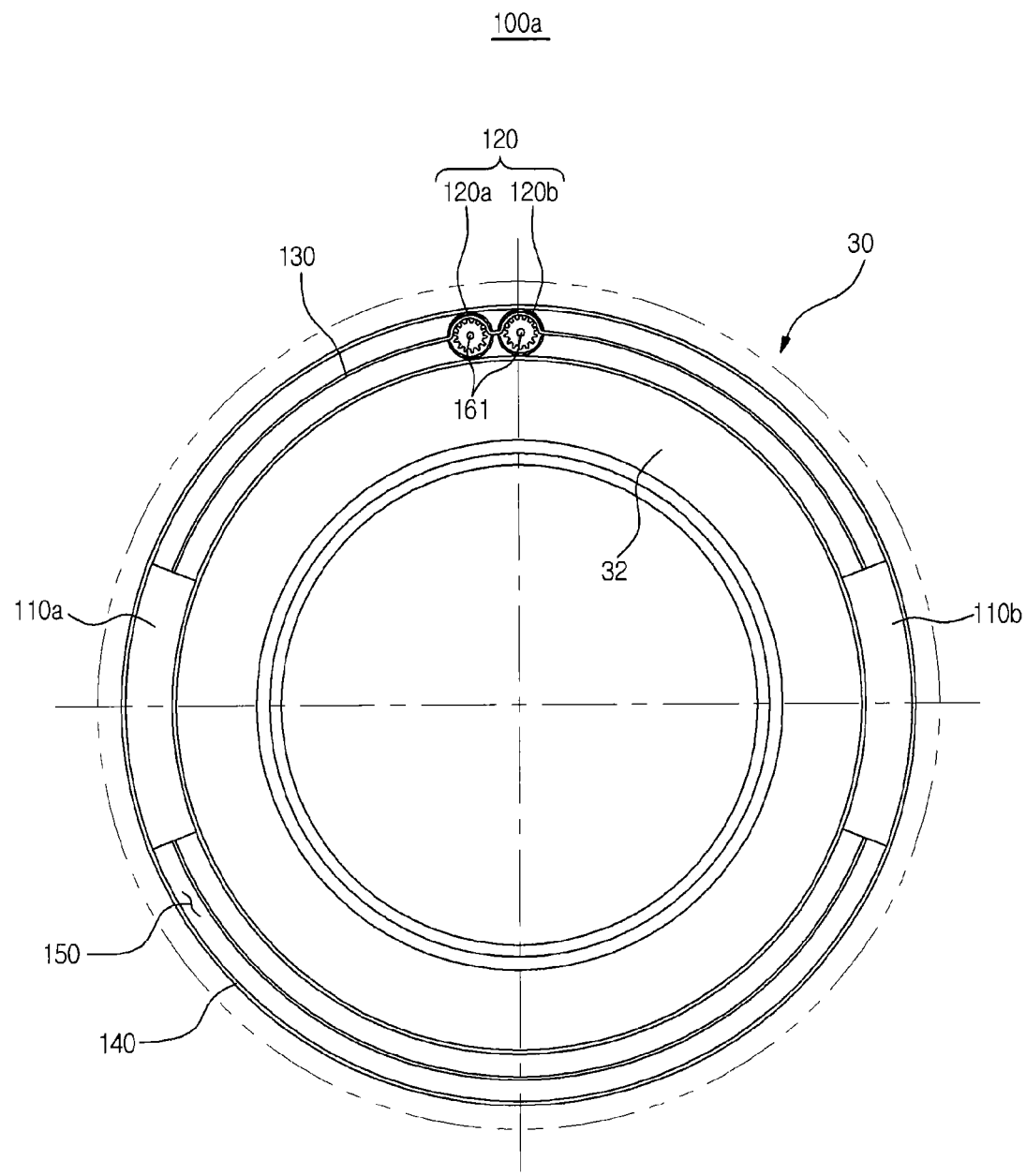
FIG. 2 is a drawing illustrating the configuration of a balancer of the washing machine in accordance with the embodiment of the present disclosure.

FIG. 2 is a drawing illustrating the configuration of a balancer of the washing machine in accordance with the embodiment of the present disclosure.

Referring to FIG. 2, a balancer 100a is provided with a balancer housing 140 having a channel 150 that is provided in the form of a ring.

A first mass 110a and a second mass 110b are disposed inside the channel 150 so as to move along the channel 150.

When the rotating tub 30 rotates, the laundry is concentrated at a certain position in the rotating tub 30, causing an unbalanced load. In this case, the first mass 110a and the second mass 110b move to a position suitable for offsetting the unbalanced load. The first mass 110a may be positioned adjacent to the second mass 110b, or may be positioned distant from the second mass 110b.

Meanwhile, if the unbalanced load does not occur in the rotating tub 30, the first mass 110a and the second mass 110b move to a certain position for keeping a load balance inbetween such that the rotating tub 30 naturally rotates.

Two wheels 120 are fixed to an upper end of the channel 150. The wheel 120 is rotatably installed at a fixed position while having a shaft 161 as a center of rotation.

The two wheels 120 include a first wheel 120a configured to move the first mass 110a and a second wheel 120b configured to move the second mass 110b.

The first wheel 120a and the second wheel 120b are illustrated as facing the opposite direction. However, according to another embodiment of the present disclosure, the first wheel 120a and the second wheel 120b may be disposed to face the same direction.

A wire 130 is installed inside the channel 150 along the channel 150. Although the FIG. 2 illustrates only one wire, that is, a first wire 130a, the wire according to the embodiment of the present disclosure is provided with two units of wires 130a and 130b to correspond to the number of the masses 110a and 110b.

The mass and the wire will be described with reference to FIG. 3.

Figure 3:
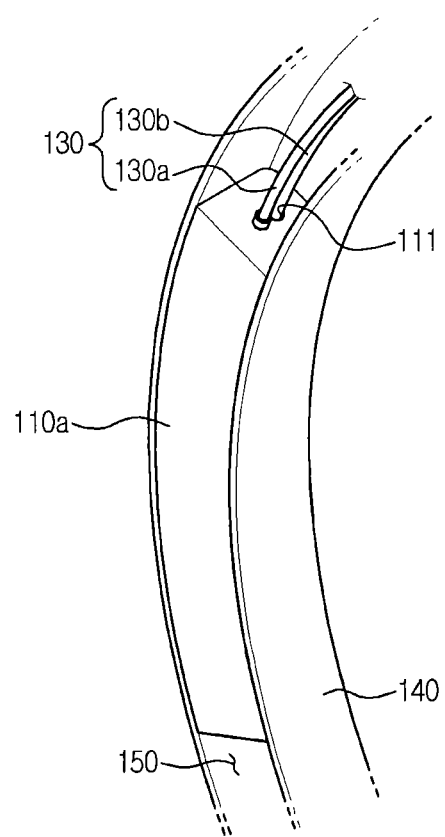
FIG. 3 is an enlarged view illustrating a portion of FIG. 2 on which a first mass exists.

FIG. 3 is an enlarged view illustrating a portion of FIG. 2 on which the first mass exists.

Referring to FIGS. 2 and 3, the wire 130 includes a first wire 130a and a second wire 130b.

The first wire 130a is inserted and fixed to the inside the first mass 110a, so that the first mass 110a moves along with the movement of the first wire 130a.

The second wire 130b penetrates the first mass 110a by passing through a through-hole 111 in the first mass 110a without being coupled to the first mass 110a. Accordingly, even if the second wire 130b moves, the movement of the second wire 130b does not affect the first mass 110a.

Different from the second wire 130b illustrated in FIGS. 2 and 3, the second wire according to the aspect of the present disclosure may not pass through the through-hole 111 while being formed distant from the first mass 110a without affecting the movement of the first mass 110a.

Although not shown in the drawings, the second wire 130b is coupled to the second mass 110b, and the first wire 130a is not coupled to the second mass 110b similar to the coupling relationship of the first and second masses 110a and 110b with respect to the second wire 130b described above.

Since the first wire 130a is engaged with the first wheel 120a, if the first wheel 120a rotates at a fixed position, the first wire 130a rotates along the first wheel 120a, so that the first mass 110a moves inside the channel 150.

The first wire 130a is not engaged with the second wheel 120b. The second wire 130b is engaged with the second wheel 120b without being engaged with the first wheel 120a.

The first wire 130a and the second wire 130b rotate independent of each other. As a result, the first mass 110a and the second mass 110b also rotate independent of each other.

Figure 4:
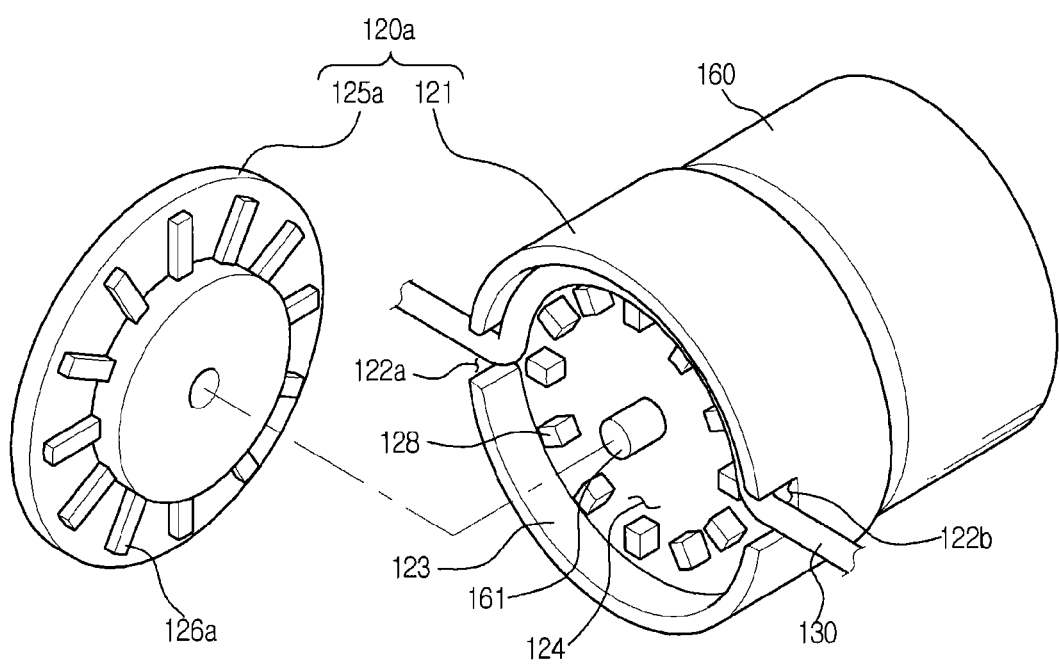
FIG. 4 is a drawing illustrating the configuration of a wheel in accordance with one embodiment of the present disclosure.

FIG. 4 is a drawing illustrating the configuration of a wheel in accordance with one embodiment of the present disclosure.

Referring to FIG. 4, the wheel body 121 is configured to form the external appearance of the wheel 120a, and to fix the wheel 120a to the inside of the channel 150 (150 in FIG. 2). The motor 40 is provided at a rear surface (not shown) of the wheel body 121.

The motor 40 is provided with the shaft 161 that extends to transmit a rotary force of the motor 40 and protrudes beyond the front surface of the wheel body 121 while passing through the center of the wheel body 121.

A protrusion 123 is protruded at a periphery of the front surface of the wheel body 121, thereby forming a recess 124 at which a rotating part 125a and the wire 130 are disposed.

A plurality of support ribs 128 is formed while protruding from the front surface of the wheel body 121 so as to support the wire 130.

Through holes 122a and 122b allowing the wire 130 to pass therethrough are formed through the protrusion 123 in the horizontal direction of the front surface of the wheel body 121.

The rotating part 125a is provided in the form of a disk having the same size as the recess 124. The rotating part 125a has a center coupled to the shaft 161 that protrudes beyond the front surface of the wheel body 121, so that the rotary force of the motor 40 is transmitted to the rotating part 125a through the shaft 161.

The wire 130 is inserted into the inside the wheel body 121 through the through-holes 122a and 122b, is pressed by a rib 126a while being supported by the support rib 128, and comes out of the wheel body 121 through the through-holes 122a and 122b.

A surface of the rotating part 125a adjacent to the front surface of the wheel body 121 is provided with a plurality of ribs 126a. The rib 126a presses the wire 130 so as to rotate the wire 130 along with the rotation of the rotating part 125a.

The connecting structure of the motor 40 will be described later with reference to FIGS. 8A and 8B in detail.

Figure 5A:
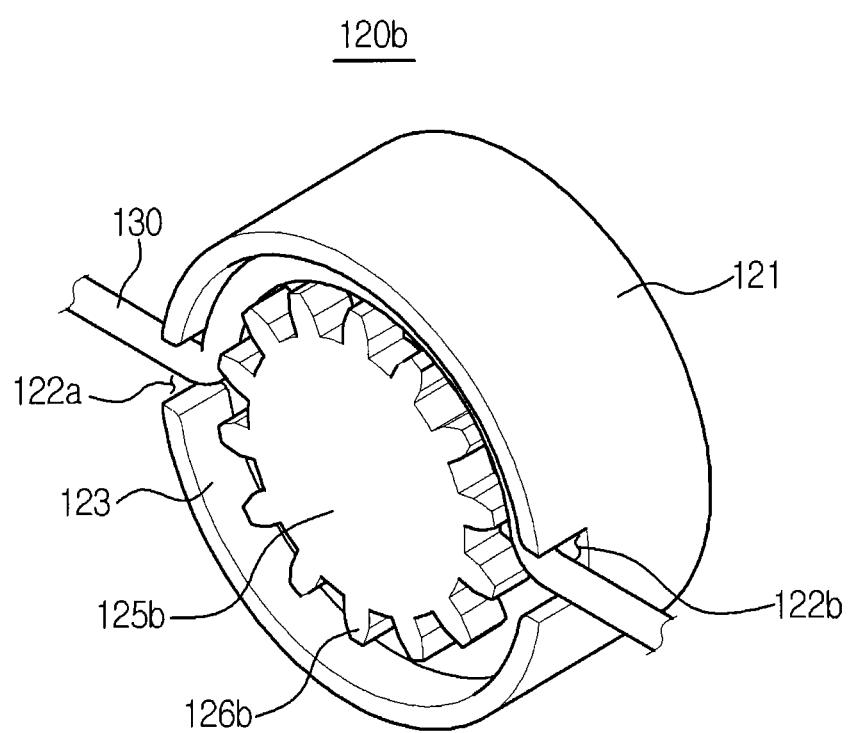
FIGS. 5A and 5B are drawings illustrating the configuration of a wheel in accordance with another embodiment of the present disclosure.
Figure 5B:
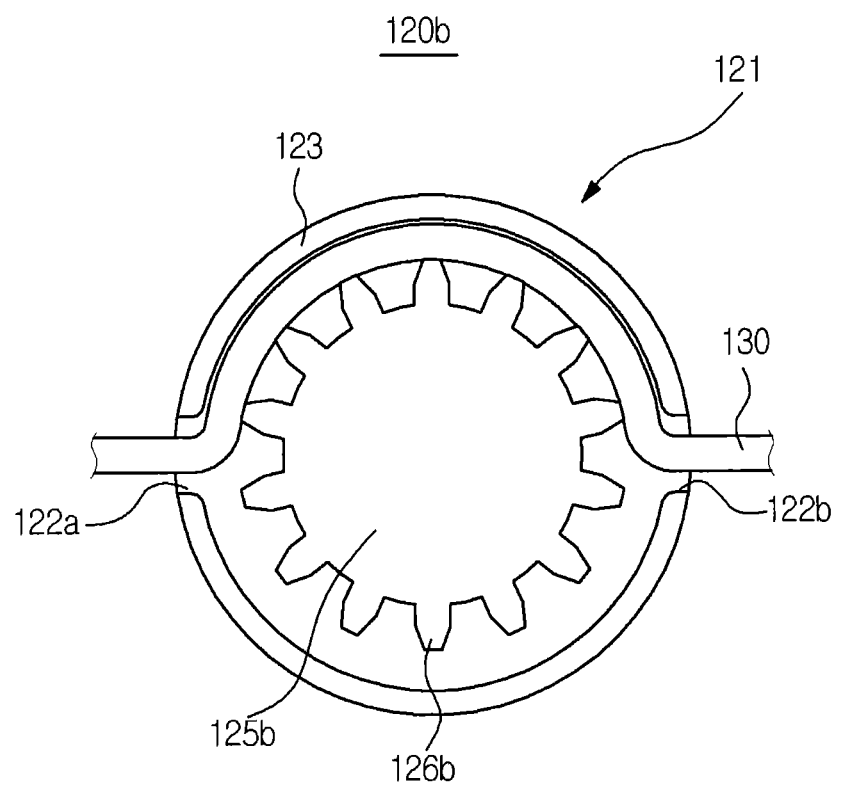

FIGS. 5A and 5B are drawings illustrating the configuration of a wheel in accordance with another embodiment of the present disclosure.

Referring to FIGS. 5A and 5B, the wheel body 121 is configured to form the external appearance of a wheel 120b, and to fix the wheel 120b to the inside of the channel (150 in FIG. 2). A motor provided at a rear surface of the wheel body 121 is not illustrated.

Similar to the above description, a shaft (not shown) of the motor (not shown) protrudes beyond the front surface of the wheel body 121 by penetrating the wheel body 121, and the center of a rotating part 125b is coupled to the shaft (not shown).

A protrusion 123 is protruded at the periphery of the front surface of the wheel body 121, thereby forming the recess 124 at which the rotating part 125b and the wire 130 are disposed.

The through-holes 122a and 122b are formed at opposite sides of the wheel body 121 in the horizontal direction of the recess 124 and allow the wire 130 to pass therethrough.

The rotating part 125b is provided in the form of a disk having the same size of the recess 124. The rotating part 125b is inserted into the recess 124 and coupled to the wheel body 121.

A plurality of protrusion ribs 126b is formed along a circumference of the rotating part 125b while protruding in an outward direction thereof, thereby providing the rotating part 125b in a general gear shape.

The wire 130 is inserted into the wheel body 121 through one of the through-holes 122a and 122b, passes through in between the protrusion rib 126b and the protrusion 123, and comes out of the wheel body 121 through the other side one of the through holes 122a and 122b.

Since the protrusion rib 126b presses the wire 130 toward the protrusion 123, the wire 130 rotates along with the rotation of the rotating part 125b.

Figure 6A:
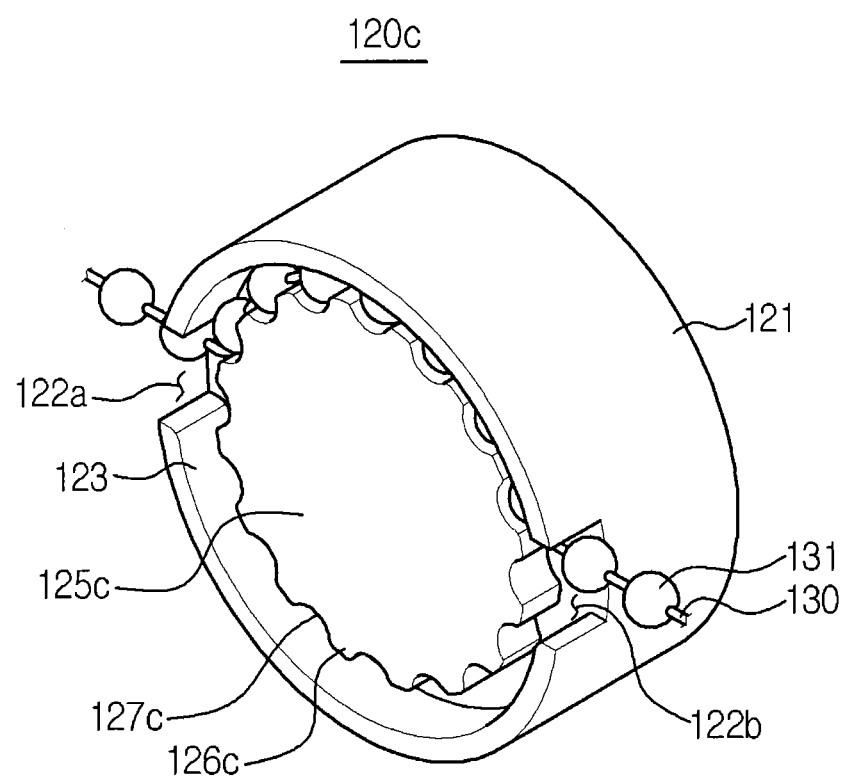
FIGS. 6A and 6B are drawings illustrating the configuration of a wheel in accordance with still another embodiment of the present disclosure.
Figure 6B:
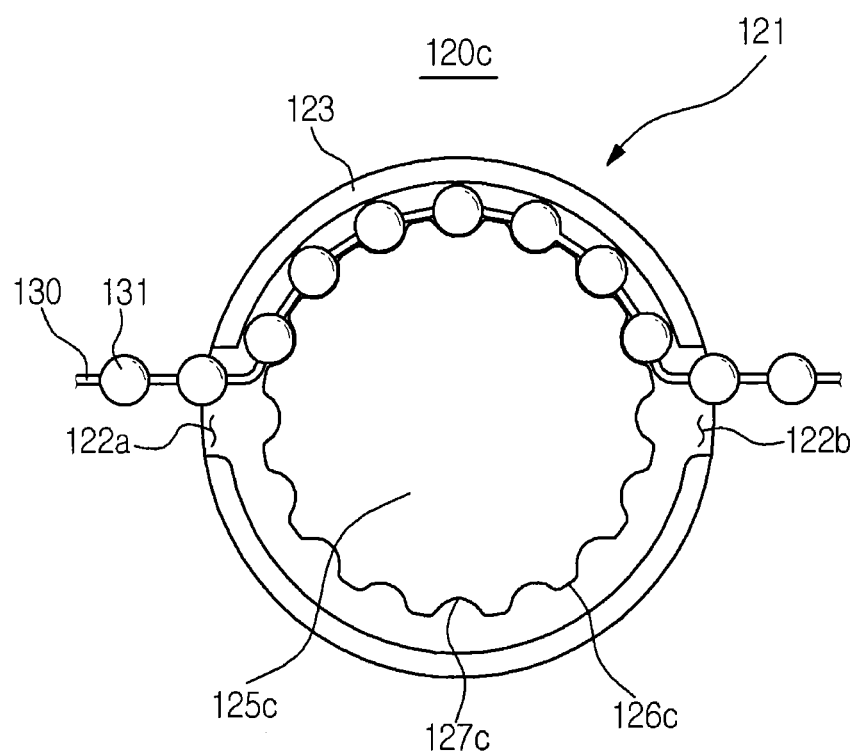

FIGS. 6A and 6B are drawings illustrating the configuration of a wheel in accordance with still another embodiment of the present disclosure.

Referring to FIGS. 6A and 6B, the wheel body 121 is configured to form the external appearance of a wheel 120c, and to fix the wheel 120c to the inside of the channel (150 in FIG. 2). A motor provided at a rear surface of the wheel body 121 is not illustrated.

Since the coupling relationship between the shaft (not shown) of the motor (not shown) and a rotating part 125c is identical to that described above, description thereof will be omitted.

A protrusion 123 is protruded at the periphery of the front surface of the wheel body 121, thereby forming the recess 124 at which the rotating part 125c and the wire 130 are disposed.

The through holes 122a and 122b are formed at opposite sides of the wheel body 121 in the horizontal direction of the recess 124, and allow the wire 130 to pass therethrough.

A plurality of beads 131 is inserted around the wire 130 along the entire length of the wire 130 at equal intervals.

The rotating part 125c is provided in the form of a disc having the same size as the recess. The rotating part 125c is inserted into the recess 124 and coupled to the wheel body 121.

A plurality of protrusion ribs 126c is formed along a circumference of the rotating part 125c while protruding in an outward direction thereof. A mounting part 127c is formed in between protrusion ribs 126c, which are adjacent, in the form of a smooth curve so as to mount the bead 131 thereon. Accordingly, the rotating part 125c is provided in a general gear shape.

The wire 130 is inserted into the wheel body 121 through one of the through-holes 122a and 122b, has the bead 131 of the wire 130 mounted on the mounting part 127c inside the wheel body 121, and comes out of the wheel body 121 through the other side one of the through-holes 122a and 122b.

Since the bead 131 is mounted to the mounting part 127c, as the rotating part 125c rotates, the bead 131 engaged with the mounting part 127c is moved, and thus rotates the wire 130.

Figure 7:
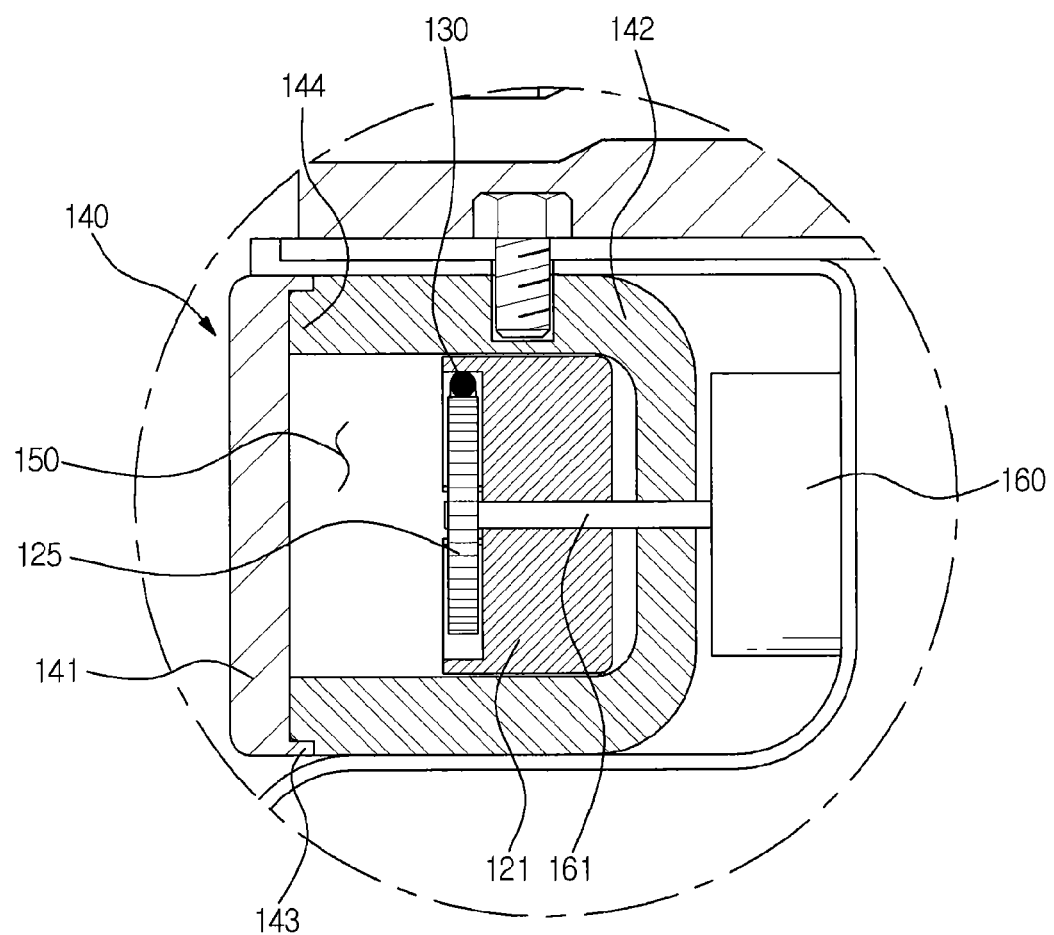
FIG. 7 is an enlarged view illustrating a portion 'A' on FIG. 1.

FIG. 7 is an enlarged view illustrating a portion 'A' on FIG. 1.

Referring to FIG. 7, the balancer is provided with a balancer housing 140 having the channel 150 formed therein.

The balance housing 140 includes a frame 142 having one side open and a cover 141 configured to close the opening of the frame 142. An inner surface of the frame 142 and an inner surface of the cover 141 form the channel 150 in cooperation with each other.

The cover 141 is provided at an outer side with a coupling protrusion 143, and the frame 142 is provided at an outer side with a stepped portion 144 with which the coupling protrusion 143 is engaged, so that the cover 141 is engaged and coupled to the frame 142.

The coupling structure of the cover 141 and the frame 142 is not limited thereto, and the aspect of the present disclosure may be implemented other coupling structure capable of coupling the cover to the frame.

A wheel including the wheel body 121 and a rotating part 125, which is disposed inside the recess 124 of the wheel body 121, is provided in the channel 150.

The wire 130 passes through in between the wheel body 121 and the rotating part 125.

The motor 40 is disposed at a rear surface of the balancer housing 140. The shaft 161 extending from the motor 40 is connected to the rotating part 125 while passing through the rear surface of the balancer housing 140 and the rear surface of the wheel body 121. The shaft 161 transmits the rotary force of the motor 40 to the rotating part 125.

Figure 8A:
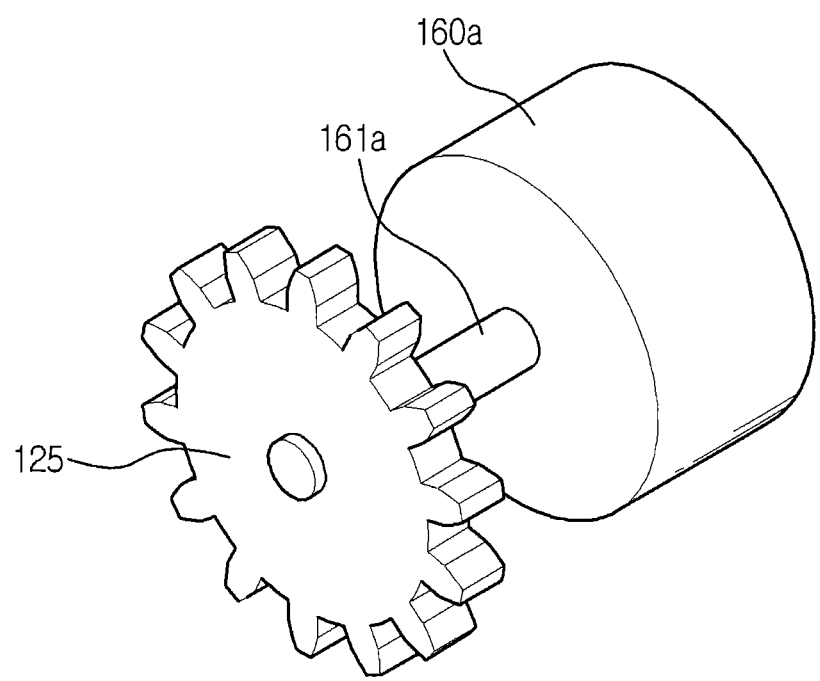
FIG. 8A is a drawing illustrating a connecting structure of a motor and a rotating part of a balancer of a washing machine in accordance with one embodiment of the present disclosure.

FIG. 8A is a drawing illustrating a connecting structure of a motor and a rotating part of a balancer of a washing machine in accordance with one embodiment of the present disclosure.

As shown in FIG. 8A, the motor 40 is provided in the same type as the motor illustrated in the above drawings.

The motor 40 is disposed at a rear side of the wheel (not shown), and is provided with a shaft 161a having one end directly connected to the motor 40. The other end of the shaft 161a is connected to the rotating part 125 while passing through the rear side of the wheel body 121 so as to rotate the rotating part 125.

The rotation of the rotating part 125 is directly controlled according to the rotation speed of the motor 40.

Figure 8B:
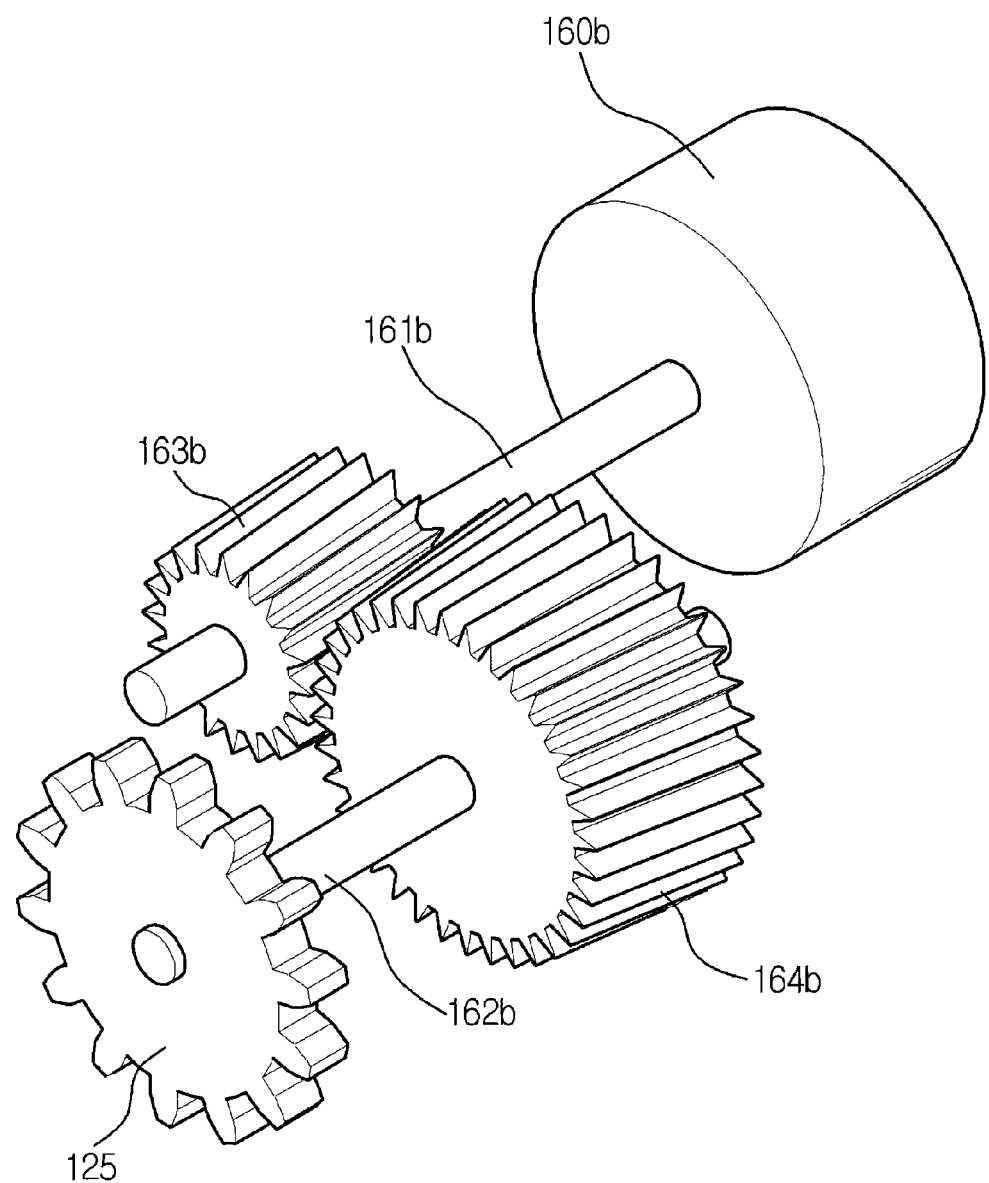
FIG. 8B is a drawing illustrating a connecting structure of a motor and a rotating part of a balancer of a washing machine in accordance with another embodiment of the present disclosure.

FIG. 8B is a drawing illustrating a connecting structure of a motor and a rotating part of a balancer of a washing machine in accordance with another embodiment of the present disclosure.

Referring to FIG. 8B, a first shaft 161b connected to the motor 40 is connected to a first gear 163b, and the first gear 163b is disposed to rotate while being engaged with a second gear 164b.

One end of a second shaft 162b is connected to the second gear 164b, and the other end of the second shaft 162b is connected to the rotating part 125.

As the rotary force of the motor 40 is transmitted to the first gear 163b through the first shaft 161b, the first gear 163b is rotated, and the second gear 164b is rotated along with the rotation of the first gear 163b while rotating the second shaft 162b, so that the rotating part 125 connected to the second shaft 162b is rotated.

By use of the first gear 163b and the second gear 164b, a gear ratio is adjusted, so that the rotation speed of the rotating part 125 is controlled.

Although the gear is illustrated as being provided in two units, the gear may be provided in plural having more than two units thereof.

Figure 9:
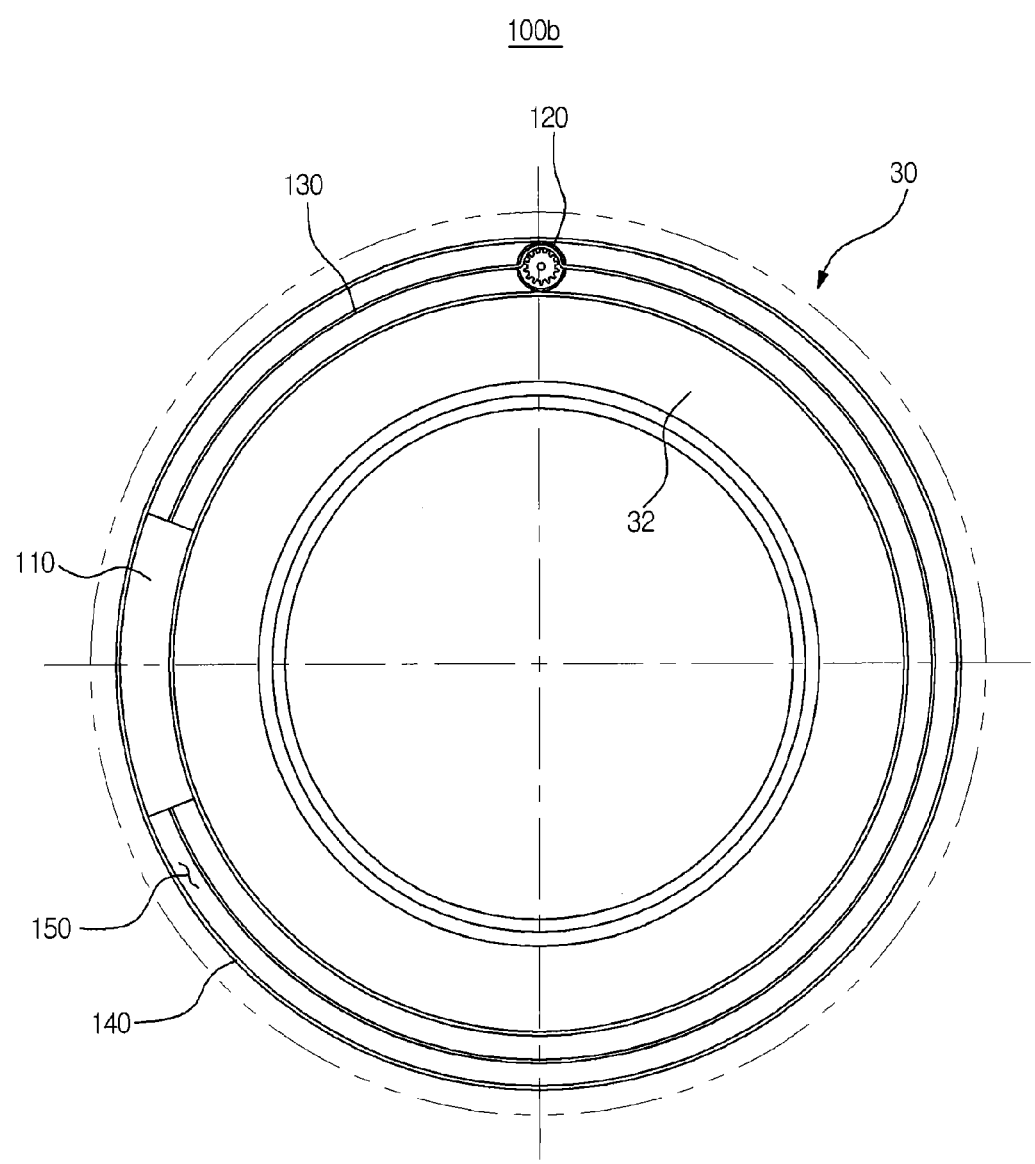
FIG. 9 is a drawing illustrating the configuration of a balancer of a washing machine in accordance with another embodiment of the present disclosure.

FIG. 9 is a drawing illustrating the configuration of a balancer of a washing machine in accordance with another embodiment of the present disclosure.

Referring to FIG. 9, a balancer 100b is provided with the balancer housing 140 having the channel 150 that is provided in the form of a ring.

A mass 110 is disposed inside the channel 150 so as to move along the channel 150, thereby offsetting an unbalanced load occurring in the rotating tub 30.

The wheel 120 is fixed at the upper portion of the channel 150, and is disposed to rotate at a fixed position while having the shaft as the center of rotation. The wheel 120 allows the mass 110 to move inside the channel 150.

The wire 130 is provided inside the channel 150 along the channel 150. The wire 130 is inserted into the inside the mass 110 and coupled to the mass 110.

Since the wire 130 is engaged with the wheel 120 and if the wheel 120 rotates at the fixed position, the wire 130 is rotated along with rotation of the wheel 120 and thus the mass 110 moves inside the channel 150.

As described above, the mass 110 moves to a position for offsetting the unbalanced load when the unbalanced load occurs in the rotating tub 30. However, if the unbalanced load does not occur in the rotating tub 30, the mass 110 may cause an unbalanced load.

In order to prevent the unbalanced load as such caused by the mass 110, the balancer is provided in a pair. The one pair of balancers will be described with reference to FIG. 10.

Figure 10:
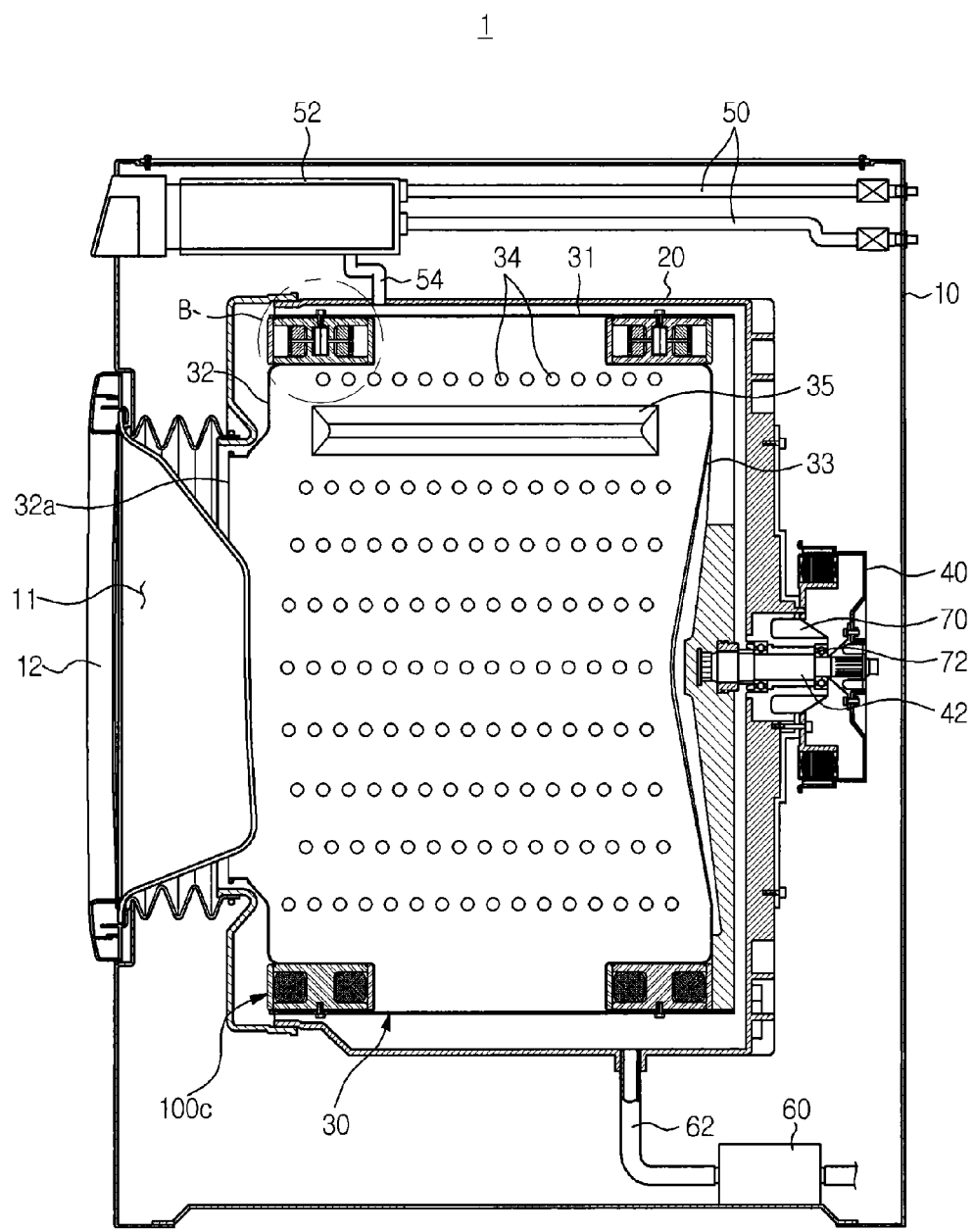
FIG. 10 is drawing illustrating the configuration of a washing machine in accordance with another aspect of the present disclosure.

FIG. 10 is drawing illustrating the configuration of a washing machine in accordance with another aspect of the present disclosure.

In the following description of the washing machine 1, details of parts identical to those of the previous embodiment will be omitted.

By use of only one balancer (100b of FIG. 9) all cases of the unbalanced load of the rotating tub 30 is difficult to be removed. Accordingly, a balancer 100c having a pair of channels is provided at the front surface panel 32 and the rear surface panel 33.

Although not shown in the drawings, the balancer 100c may be provided at one of the front surface panel 32 and the rear surface panel 33.

Since the balancer 100c serves as having a pair of masses, thereby keeping the balance of the rotating tub 30 in load regardless of whether a unbalanced load occurs in the rotating tub 30 or not.

If the unbalanced load occurs in the rotating tub 30, masses forming one pair move to be adjacent to each other, and if the unbalanced load does not occur in the rotating tub 30, the masses forming the one pair move to be distant away from each other, thereby achieving the balance in load of the rotating tub 30.

Figure 11:
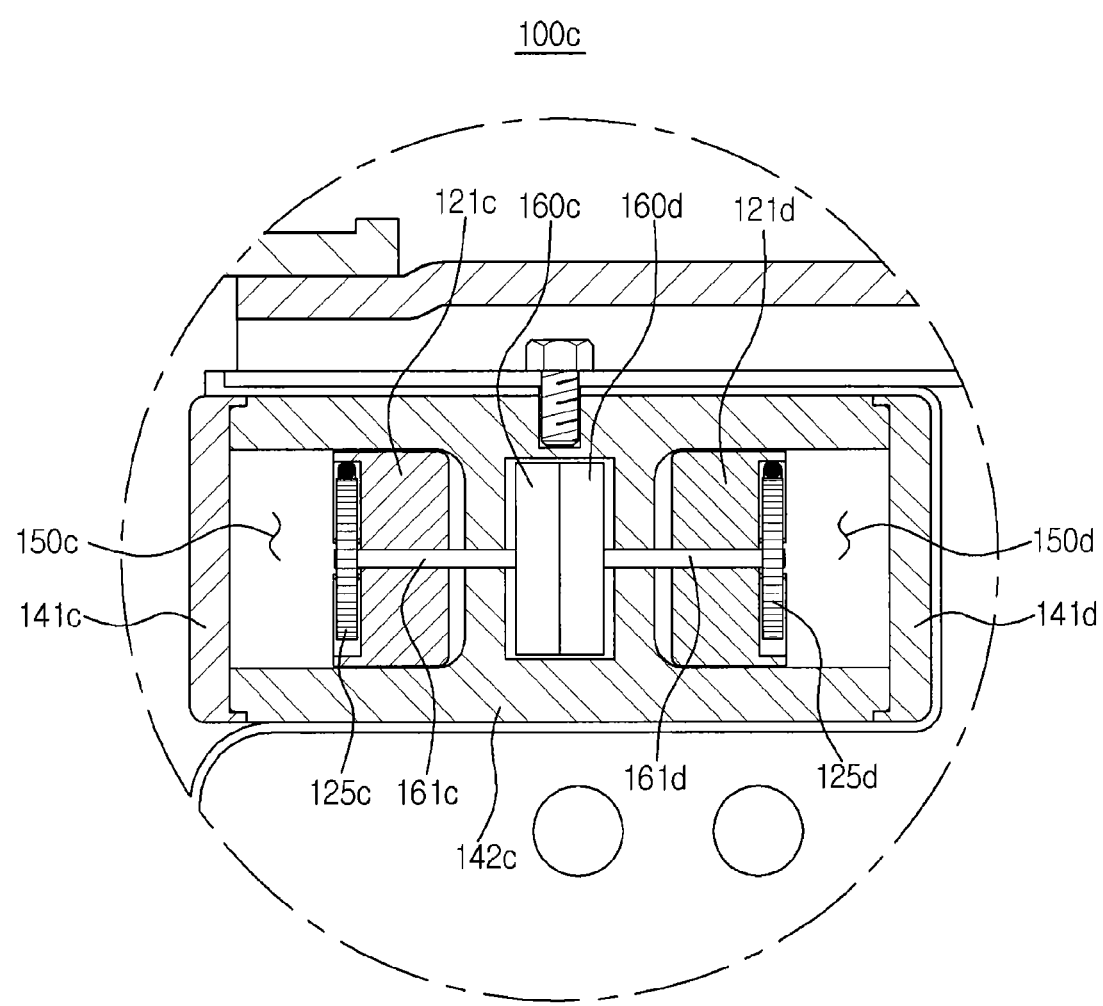
FIG. 11 is an enlarged view illustrating a portion 'B' on FIG. 10.

FIG. 11 is an enlarged view illustrating a portion 'B' of FIG. 10.

The balancer 100c is provided with a balancer housing having a pair of channels 150c and 150d formed therein.

The balancer housing includes a frame 142c having two sides open, and covers 141c and 141d configured to close the open sides of the frame 142c. The inner surface of the frame 142c and the inner surfaces of the covers 141c and 141d form the one pair of channels 150c and 150d in cooperation with each other.

Since the coupling structure of the cover 141c and 141d and the frame 142c is identical to that of the cover 141 and the frame 142 described above, the description thereof will be omitted.

Each of the channels 150c and 150d has a wheel, which includes wheel bodies 121c and 121d provided at the channels 150c and 150d, respectively, and rotating parts 125c and 125d provided at the channel 150c and 150d, respectively.

A pair of motors 160c and 160d is provided in the center of the frame 142c. Shafts 161c and 161d provided in one pair are extended from the motors 160c and 160d to the channel 150c and 150d, respectively, and are connected to the rotating parts 125c and 125d, respectively.

The shafts 161c and 161d separately receive a driving force from the motors 160c and 160d connected thereto, respectively, and transmit the received driving force to the rotating parts 160c and 160d, respectively, so that the rotating parts 160c and 160d move independent of each other.

Accordingly, a pair of wires and a pair of masses (not shown) that are connected to the one pair of rotating parts 160c and 160d are independent to each other, and move the channels 150c and 150d, respectively.

As a result, the load of the rotating tub 30 is kept balanced regardless of whether the unbalanced load occurs in the rotating tub 30.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A washing machine comprising:
a rotating tub configured to accommodate a laundry while being rotatably disposed on a shaft;
at least one mass mounted on the rotating tub so as to move in a circumferential direction of the rotating tub, thereby offsetting an unbalanced load of the rotating tub;
at least one wire extending along the circumferential direction of the rotating tub and coupled to the at least one mass; and
at least one driving unit coupled to the at least one wire and configured to rotate the at least one mass in the circumferential direction of the rotating tub.

2. The washing machine of claim 1, wherein the at least one driving unit comprises at least one wheel including a wheel body forming an external appearance of the at least one driving unit; and a rotating part provided in a disk shape so as to rotate inside the wheel body,
wherein the at least one wire is disposed to pass through the wheel body while passing through a portion in between an inner surface of the wheel body and the rotating part, thereby allowing the wire to rotate along with a rotation of the rotating part.

3. The washing machine of claim 2, wherein the rotating part comprises a plurality of protrusion ribs formed along a circumference of the rotating part while protruding in a radially outward direction, and
the at least one wire is disposed to pass through in between the wheel body and the plurality of protrusion ribs while being engaged between the wheel body and the plurality of protrusion ribs.

4. The washing machine of claim 2, wherein the rotating part comprises a plurality of protrusion ribs that is formed at a circular surface of the rotating part facing the wheel body, and
the at least one wire is disposed to pass through in between the wheel body and the plurality of protrusion ribs while being engaged between the wheel body and the plurality of protrusion ribs.

5. The washing machine of claim 2, wherein the at least one wire comprises a plurality of beads inserted around the at least one wire along an entire length of the at least one wire.

6. The washing machine of claim 5, wherein the rotating part comprises a plurality of protrusion ribs formed along a circumference of the rotating part while protruding in a radially outward direction, and
the at least one wire is disposed to pass through in between the wheel body and the plurality of protrusion ribs while having the plurality of beads of the at least one wire engaged in between the plurality of protrusion ribs.

7. The washing machine of claim 2, wherein the rotating part is rotated by a motor.

8. The washing machine of claim 7, further comprising a shaft provided between the rotating part and the motor so as to transmit a driving force of the motor to the rotating part.

9. The washing machine of claim 7, wherein a plurality of gears is provided between the rotating part and the motor to transmit a driving force of the motor to the rotating part.

10. The washing machine of claim 1, wherein the at least one mass comprises a first mass and a second mass that are available to rotate in the circumferential direction of the rotating tub,
the at least one wire comprises a first wire configured to move the first mass and a second wire configured to move the second mass, and
the at least one driving unit comprises at least one first driving unit configured to rotate the first wire and at least one second driving unit to configured to rotate the second wire.

11. The washing machine of claim 10, wherein the first mass and the second mass move independent of each other.

12. The washing machine of claim 10, wherein the first wire is coupled to the first mass while passing through the second mass, and
the second wire is coupled to the second mass while passing through the first mass.

13. The washing machine of claim 1, further comprising at least one balancer housing configured to accommodate the at least one mass, the at least one wire and the at least one driving unit therein while being coupled to the rotating tub, the at least one balancer housing forming a ring shape channel enabling the mass to move therethrough.

* * * * *